(12) United States Patent
Paterson et al.

(10) Patent No.: US 8,308,019 B2
(45) Date of Patent: Nov. 13, 2012

(54) BATTERY BATH AND JOINT ASSEMBLY THEREFOR

(75) Inventors: Clinton J. Paterson, Fort Gratiot, MI (US); John O. Wirtz, Fort Gratiot, MI (US)

(73) Assignee: Wirtz Manufacturing Co., Inc., Port Huron, MI (US)

( * ) Notice: Subject to any disclaimer, the term of this patent is extended or adjusted under 35 U.S.C. 154(b) by 882 days.

(21) Appl. No.: 12/406,606

(22) Filed: Mar. 18, 2009

(65) Prior Publication Data
US 2010/0240274 A1    Sep. 23, 2010

(51) Int. Cl.
*B65D 6/16* (2006.01)

(52) U.S. Cl. .................. 220/681; 220/677; 220/693
(58) Field of Classification Search ........... 220/DIG. 25, 220/681, 677, 693, 692; 277/641, 630, 644
See application file for complete search history.

(56) References Cited

U.S. PATENT DOCUMENTS

| | | | | |
|---|---|---|---|---|
| 1,723,307 | A | * | 8/1929 | Sipe ................................. 52/395 |
| 3,204,971 | A | * | 9/1965 | Meriano ........................ 277/641 |
| 4,457,441 | A | * | 7/1984 | McCloughan ............... 220/4.12 |

* cited by examiner

*Primary Examiner* — Stephen Castellano
(74) *Attorney, Agent, or Firm* — Reising Ethington P.C.

(57) ABSTRACT

A joint assembly and a tub assembly for a battery bath. The joint assembly has a seal that extends between a first flange of a first section and a second flange of a second section. The seal sealing a gap defined between the first and second flanges.

13 Claims, 6 Drawing Sheets

BATTERY BATH AND JOINT ASSEMBLY THEREFOR

FIELD OF THE INVENTION

The present invention relates generally to lead-acid battery manufacture, and more particularly to battery baths.

BACKGROUND OF THE INVENTION

Manufacturing lead-acid batteries may include using a bath to charge batteries, immerse batteries in coolant, rinse batteries with a coolant, or test batteries at various temperatures while immersed. In any of these processes, the liquid used may turn acidic and may damage exposed surfaces of the bath. Over time, the surfaces could deform, crack, leak, and require replacement.

SUMMARY OF THE INVENTION

One embodiment of a joint assembly that may be used with a battery bath may include a seal. The seal may extend between a first flange of a first section of the battery bath and a second flange of a second section of the battery bath. The first and second sections may form, or may be part of, an assembly such as a tub assembly. The seal may seal a gap that is defined between the first flange and the second flange. Together, the gap and the seal may accommodate changes in the shape and other deformations of the first section, the second section, or both.

One embodiment of a tub assembly that may be used with a battery bath may include a first section, a second section, and a joint assembly. The first section may have a first flange located at a free end. The first flange may have a first inner face. The second section may have a second flange located at a free end. The second flange may have a second inner face. The joint assembly may space the first inner face away from the second inner face so that the inner faces do not contact each other throughout their opposing extent.

One embodiment of a tub assembly that may be used with a battery bath may include a first section, a second section, and a seal. The first section may have a first flange located at a free end. The first flange may have a first inner face and a first retention feature. The second section may have a second flange located at a free end. The second flange may have a second inner face and a second retention feature. The seal may have a third retention feature that, in assembly, mates with the first retention feature. The seal may also have a fourth retention feature that, in assembly, mates with the second retention feature. The seal may seal a gap that is defined between the first inner face and the second inner face. The first and second inner faces may not contact each other along their opposing extent. Together, the seal and the gap may accommodate changes in shape and other deformations of the first section, the second section, or both, such that when and if the changes in shape occur, the first and second inner faces move toward each other.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Referring in more detail to the drawings, the figures show two exemplary embodiments of a joint assembly 10 for a battery bath 12 of a battery bath machine or other machine. The joint assembly 10 may be flexible to accommodate changes in the shape or relative position of components of the battery bath 12. The changes in shape may include the walls expanding, contracting, and/or bulging due to exposure to corrosive liquids, temperature variations, and other circumstances.

Figure 1:
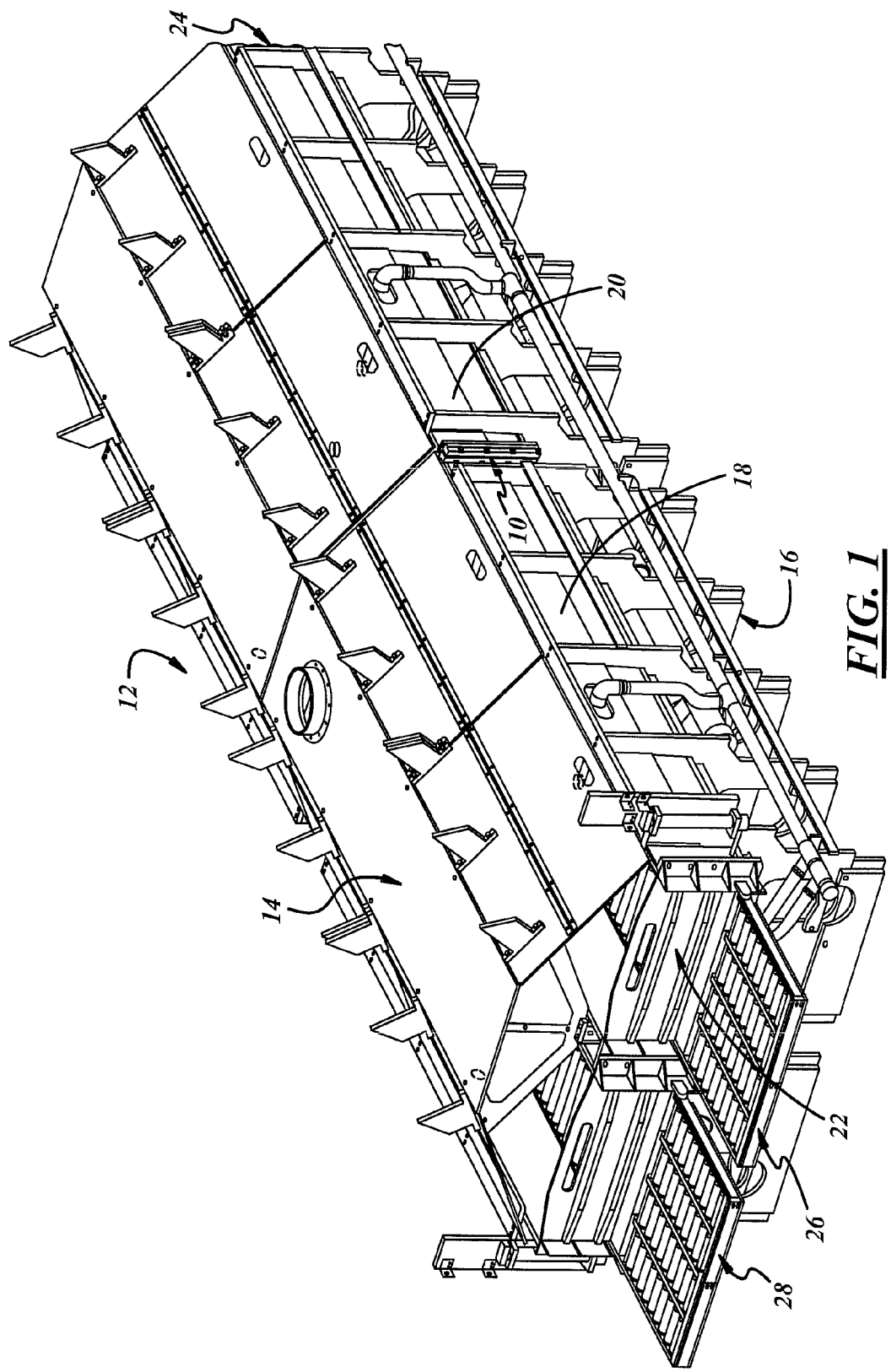
FIG. 1 is a perspective view of an exemplary battery bath.
Figure 2:
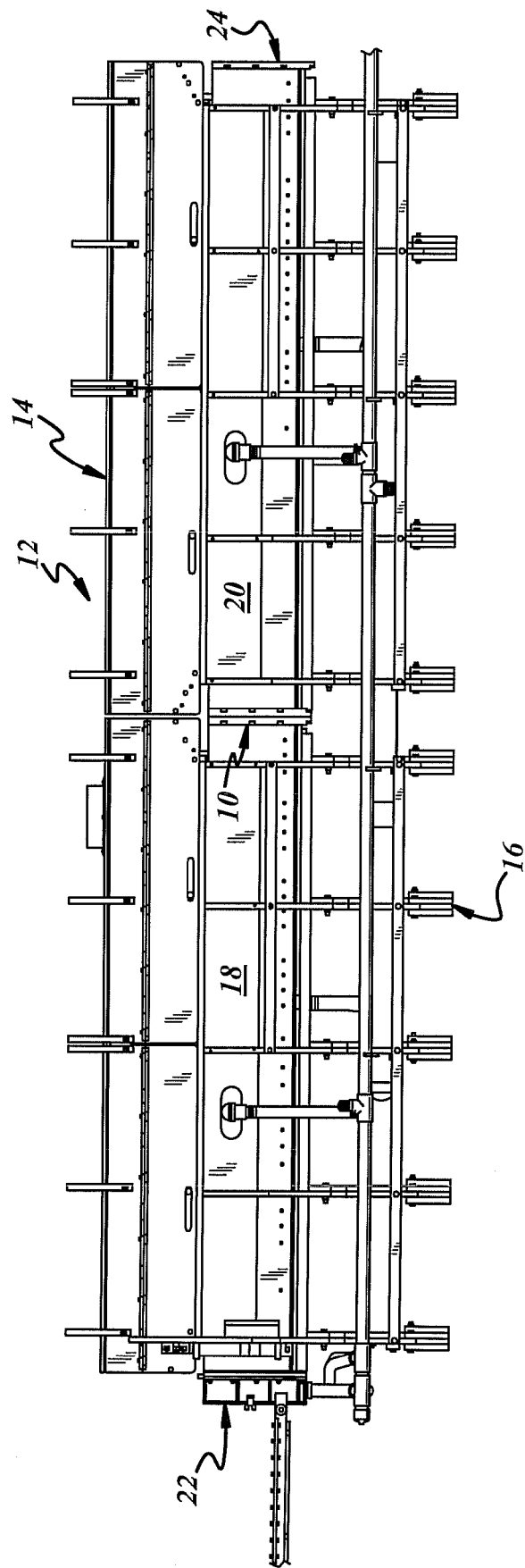
FIG. 2 is a side view of the battery bath of FIG. 1.

The battery bath 12 may be any one of a variety of baths that are used for any one of a variety of battery processes including, but not limited to, charging batteries, immersing batteries in a coolant such as water, rinsing or showering batteries with a coolant, testing batteries at various temperatures while they are immersed in a coolant, or other processes involved in manufacturing and testing batteries. Referring to FIGS. 1 and 2, the exemplary battery bath 12 includes a housing 14 that is supported by a base 16. The housing 14 may include multiple sections, units, or segments that are connected together. In the example shown, the housing 14 includes two sections 18, 20. The first section 18 may be anchored or otherwise fixed at an infeed station 22, the second section 20 may be anchored or otherwise fixed at an outfeed station 24, and the joint assembly 10 may unite the first and second sections between the infeed and outfeed stations. The various walls of the multiple sections may be composed of a plastic such as polypropylene or polyethylene, a metal such as stainless steel, or other materials suitable for use with the bath liquid. The battery bath 12 may also include a first conveyer 26 and a second conveyer 28 to transport batteries through the bath. In other examples not shown, the battery bath 12 may include more, less, and/or different components than those shown and described here.

Figure 3:
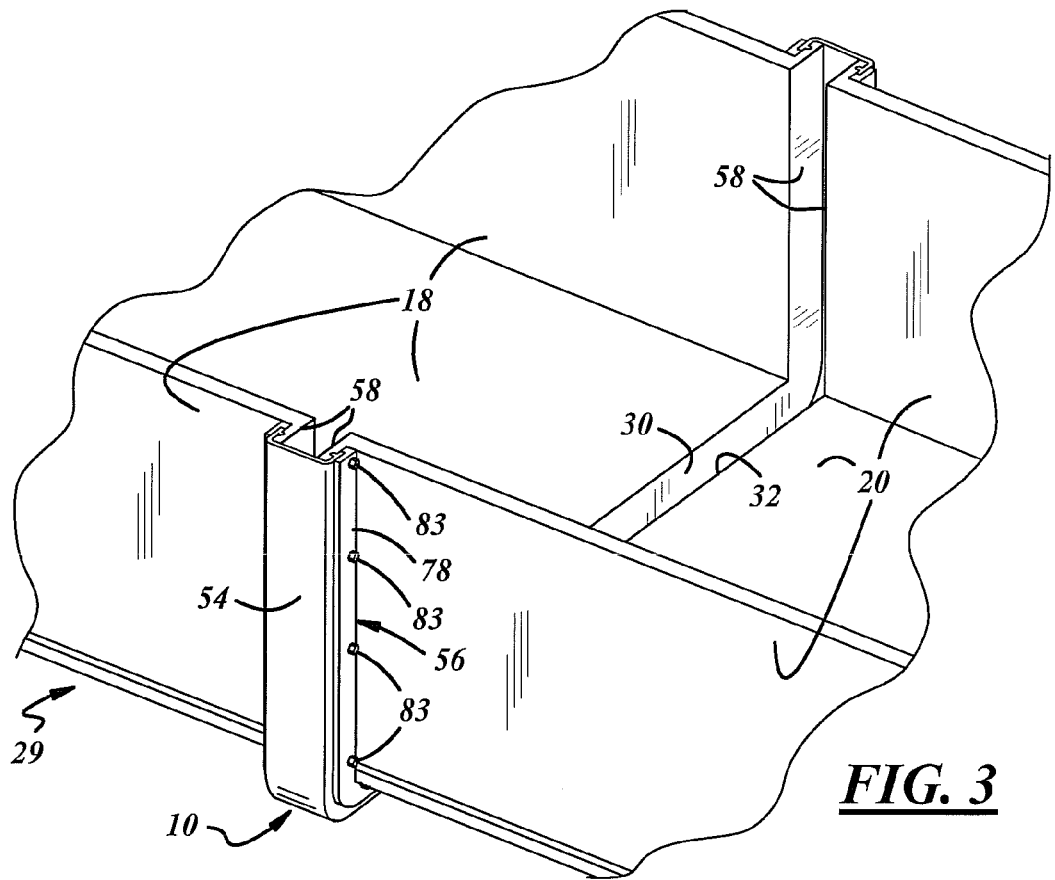
FIG. 3 is a fragmented perspective view of an exemplary tub assembly joined by a first exemplary embodiment of a joint assembly.
Figure 4:
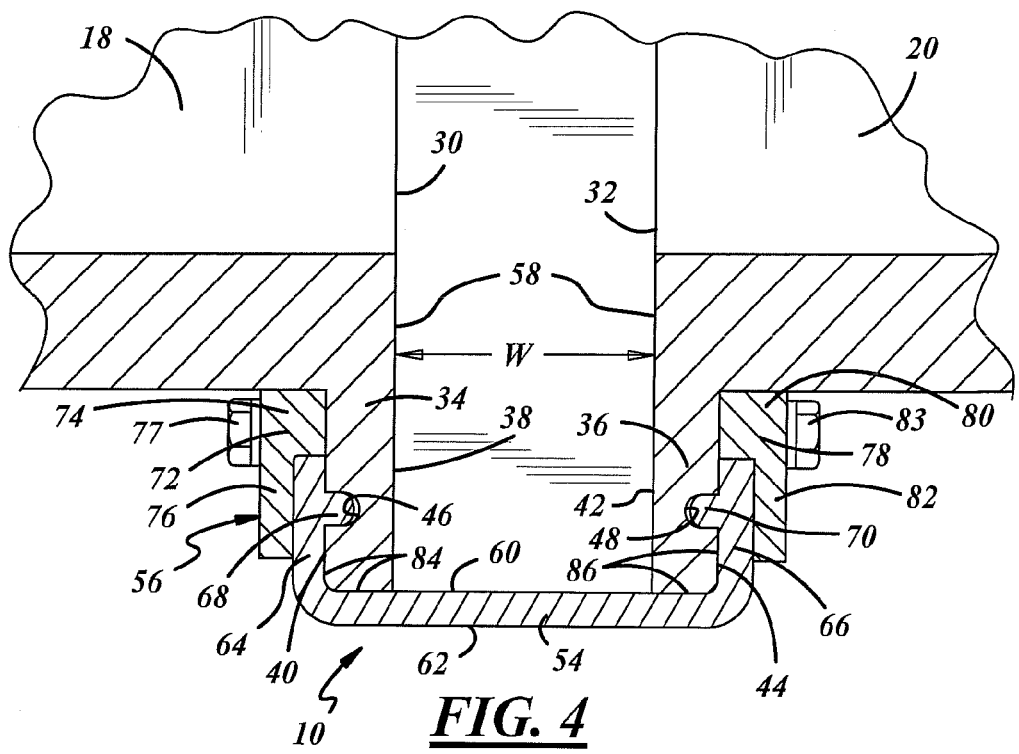
FIG. 4 is an enlarged sectioned view of the joint assembly of FIG. 3.
Figure 6:
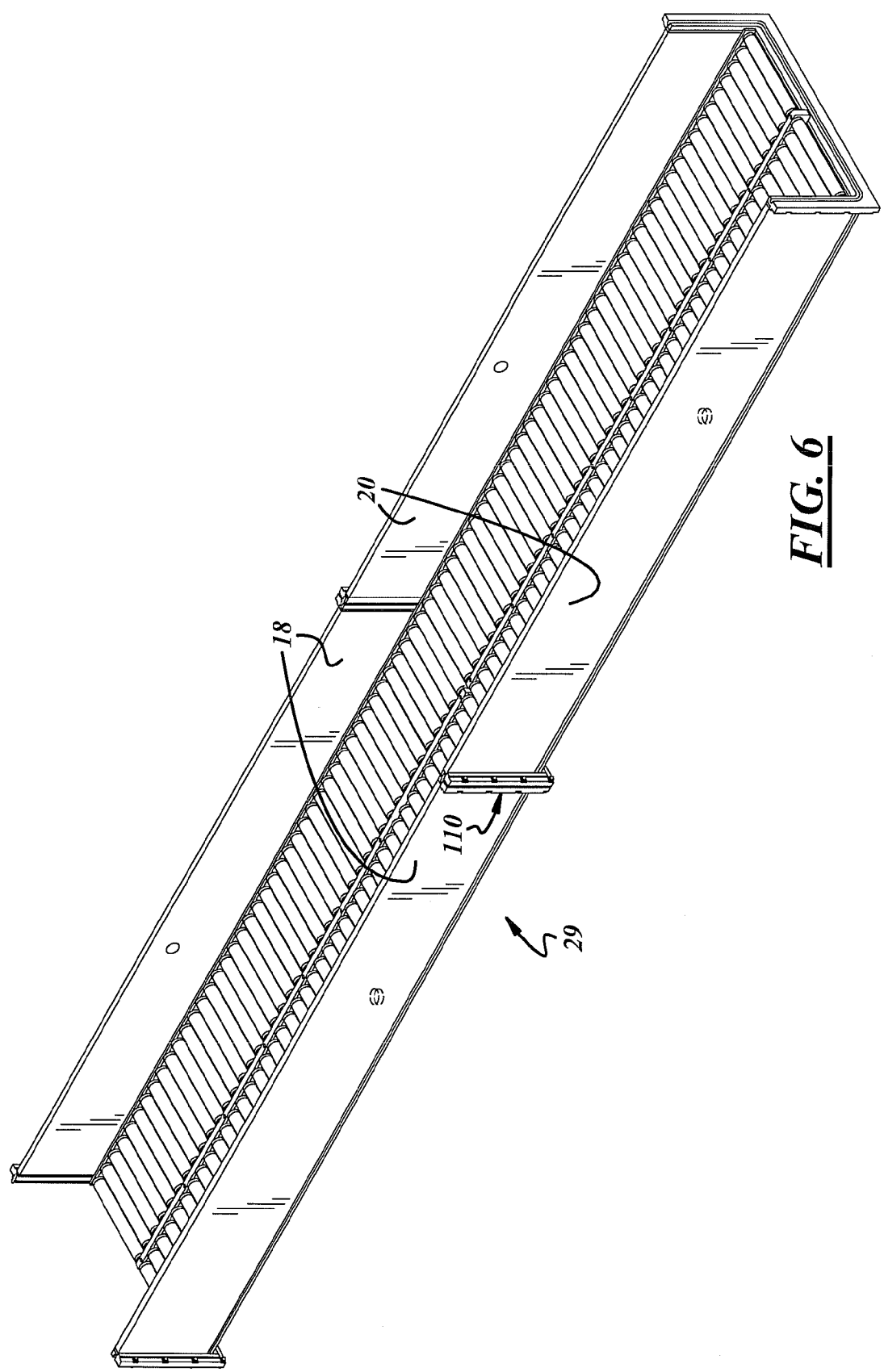
FIG. 6 is a perspective view of an exemplary tub assembly joined by a second exemplary embodiment of a joint assembly.

The first and second sections 18 and 20 may include side and bottom walls. Together, the first and second sections 18, 20 may be part of a tub assembly 29 (FIGS. 3 and 6) of the battery bath 12, or may be a part of some other assembly. When assembled, the first and second sections 18 and 20 may be positioned in a line with one another, may be joined by the joint assembly 10, and may hold a liquid such as a coolant. Referring to FIGS. 3 and 4, the first section 18 may terminate at a first free end 30, and the second section 20 may terminate at a second free end 32. The first section 18 may have a first flange 34, and the second section 20 may have a second flange 36. The first and second flanges 34, 36 may be a peripheral rim extending continuously along the respective first and second free ends 30 and 32. The first and second flanges 34, 36 may be separate pieces that are attached to the respective free end, or may be formed as one-piece with the respective section.

The first flange 34 may have a first inner face 38 and an opposite first outer face 40, and the second flange 36 may have a second inner face 42 and an opposite second outer face 44. Each flange may also have a retention feature.

The retention features may have various shapes, sizes, constructions, and configurations that may interact with complementary retention features of the joint assembly 10 to help position, hold, and/or seal the respective flange with the joint assembly. Referring to FIG. 4, in one example the retention feature of the first flange 34 is a first groove 46 defined in the first outer surface 40. The first groove 46 may extend continuously in a longitudinal direction along the first flange 34. In one example, the retention feature of the second flange 36 is a second groove 48 defined in the second outer face 44. The second groove 48 may extend continuously in a longitudinal direction along the second flange 36. In other examples, the retention features of the flanges may include a number of discontinuous and separate recesses, may include a protrusion such as a bead, lobe, or rivet, or may include some other structure.

Figure 5:
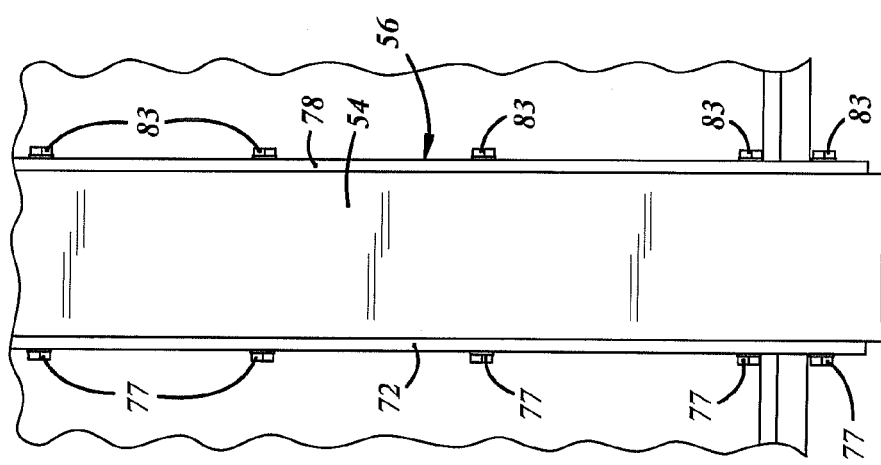
FIG. 5 is a front view of the joint assembly of FIG. 3.

The joint assembly 10 may connect the first and second sections 18 and 20 together, and may provide a space to accommodate changes in shape of the first section, the second section, or both, to help prevent damage to the sections. In a first exemplary embodiment of FIGS. 3-5, the joint assembly 10 may overlap and seal the first and second flanges 34, 36, and may extend along the longitudinal length of the first and second flanges. The joint assembly 10 may include a seal 54, a retainer 56, and may define a gap 58.

The seal 54 spans and seals the gap 58 in order to prevent fluid leaks at the gap and between the first and second sections 18, 20. The seal 54 may have a one-piece structure, may have an elongated body, and may be u-shaped in cross-section. The seal 54 may be composed of a sponge, a rubber, or any other suitable material. The seal 54 may include an inner surface 60, an outer surface 62, and a first side 64 and an opposite second side 66. The seal 54 may have a retention feature located on the inner surface 60 at each side 64, 66. Like the retention features of the flanges, these retentions features may have various shapes, sizes, constructions, and configurations to help position, hold, and/or seal the seal 54 to the respective flange. As best shown in FIG. 4, the retention feature at the first side 64 may be a protruding first bead 68 that extends continuously in the longitudinal direction along the first side, and the retention feature at the second side 66 may be a protruding second bead 70 that extends continuously in a longitudinal direction along the second side. In other examples, the retention features of the seal 54 may vary, and may complement those described for the flanges. For example, the retention features may include a number of separate projections, may include a recess, or may include some other structure.

The retainer 56 may secure the seal 54 to the first and second flanges 34, 36. The retainer 56 may have various shapes, sizes, constructions, and configurations. In the example shown, on one side the retainer 56 may include a first locking plate 72 that may extend continuously in a longitudinal direction along the first flange 34. The first locking plate 72 may have a first portion 74 that may be flush against the first flange 34, and may be stepped to a reduced thickness to a second portion 76 that overlies the first side 64 of the seal 54 to trap the seal against the first flange. The first locking plate 72 may overlie the first bead 68 to ensure that the first bead remains seated in the first groove 46. A plurality of first bolts 77 may be used to hold the first locking plate 72 on the first flange 34. The first bolts 77 may pass through the first locking plate and into the first flange 34 (but preferably not fully through the first flange) without passing through any portion of the seal 54, if desired.

On another side, the retainer 56 may also have a second locking plate 78 that is similar in construction and functionality to the first locking plate 72. The second locking plate 78 may have a first portion 80 that may lie flush against the second flange 36, and may have a second portion 82 overlying the second side 66 and the second bead 70. And likewise, a plurality of second bolts 83 may be used to hold the second locking plate 78 on the second flange 36.

The gap 58 may be defined laterally between the first inner face 38 and the second inner face 42 of the first and second flanges 34, 36. When the joint assembly 10 is first assembled, the gap 58 may extend continuously and longitudinally along the extent of the opposing flanges such that the flanges do not touch. The exact lateral dimension W of the gap 58 may vary and may depend on, among other factors, the expected deformation of the sections.

To assemble the joint assembly 10, the first and second sections 18, 20 are aligned with each other whereby the first and second free ends 30, 32 are spaced apart to define the gap 58. The gap 58 may have various dimensions ranging anywhere between ¼ of an inch and 5/16 of an inch, of course other example dimensions are possible; likewise, the seal 54 may be dimensioned accordingly in order to span the gap, examples include ¼ of an inch and 5/16 of an inch. The seal 54 may be wrapped around the first and second flanges 34, 36 to close the gap 58 on one side thereof. The first bead 68 may be received in the first groove 46, and the second bead 70 may be received in the second groove 48. The retainer 56 may then be tightened down on the seal 54 such that the first locking plate 72 bears against the first side 64 and the second locking plate 78 bears against the second side 66. With the retainer 56 exposed on the outside of the first and second sections 18, 20, an operator may access the joint assembly 10 for adjustment, repair, or replacement. When assembled, a first sealing interface 84 may be formed between the inner surface 60 of the seal 54 and the first outer face 40 of the first flange 34, and a second sealing interface 86 may be formed between the inner surface of the seal and the second outer face 44 of the second flange 36.

When a change in shape occurs in either the first section 18, the second section 20, or both, the joint assembly 10 may accommodate the change in shape by permitting relative displacement and movement between the first inner face 38 and the second inner face 42, such as slight misalignments between the first and second sections, while still maintaining the seal 54 between the first and second flanges 34, 36. Therefore, the first and second sections 18, 20 do not crack, leak, or require replacement as may happen without the joint assembly 10. In some changes in shape, the respective walls of the first and second sections 18, 20 tend to swell or expand which may decrease the gap 58. And in some changes in shape, the first and second flanges 34, 36 may be brought toward each other such that the first inner face 38 and the second inner face 42 contact each other at a point or at a line to form an additional seal. Indeed, in some cases, the joint assembly 10 may encourage the first and second flanges 34, 36 to come together.

Figure 7:
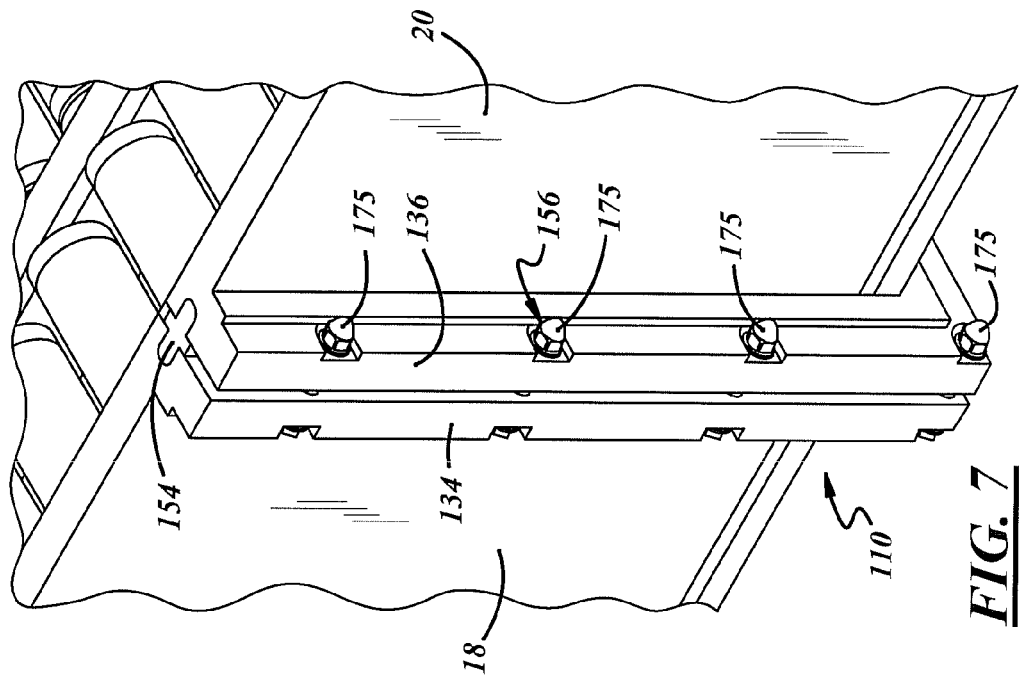
FIG. 7 is a fragmented perspective view of the joint assembly of FIG. 6.
Figure 8:
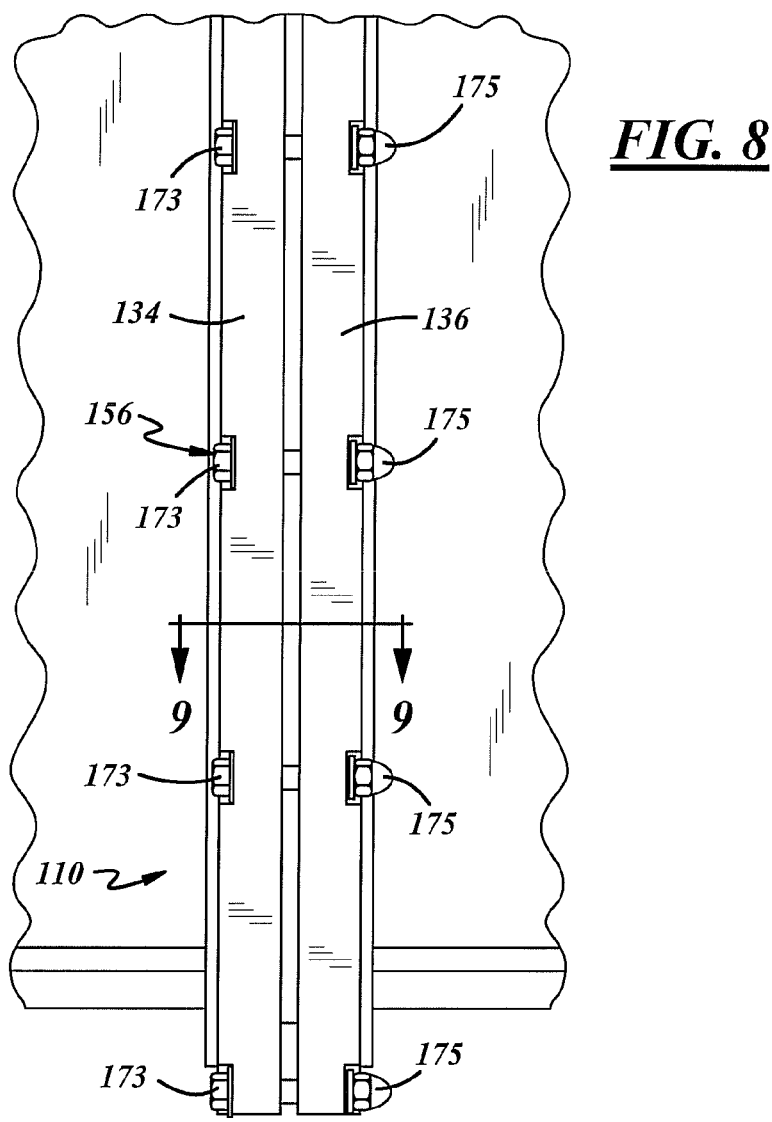
FIG. 8 is a front view of the joint assembly of FIG. 6.
Figure 9:
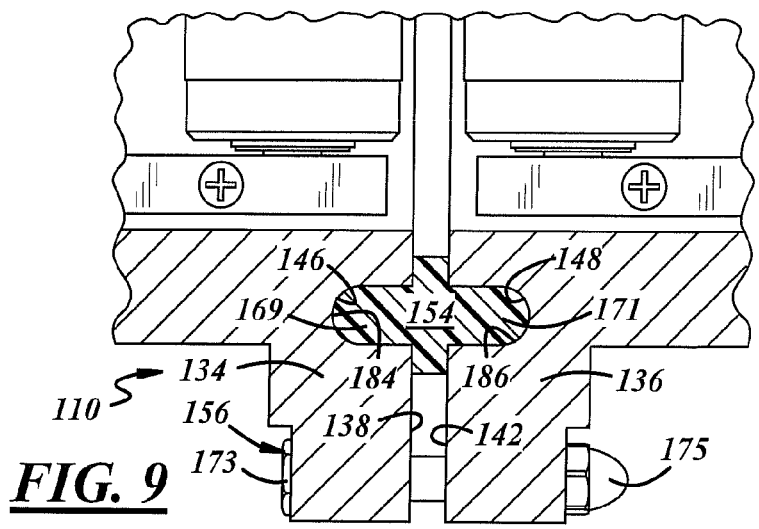
FIG. 9 is an enlarged sectioned view taken along line 9-9 in FIG. 8.

A second exemplary embodiment of a joint assembly 110 is shown in FIGS. 7-9. First and second flanges 134 and 136 may each have a retention feature on their respective inner faces 138 and 142. The retention features may be a first groove 146 and a second groove 148 that each extend continuously in a longitudinal direction along their respective flanges. As before, the retention features may take other forms.

A seal 154 may have a complementary retention feature to that of the flanges. In this case, in cross-section, the seal 154 forms a protruding first lobe 169 and an oppositely protruding second lobe 171. A retainer 156 may include a plurality of longitudinally spaced-apart bolts 173. The bolts 173 may each extend completely through the first flange 134 and completely through the second flange 136, outboard of the seal 154, and may be tightened down by nuts 175.

In assembly, the first and second flanges 134, 136 may be aligned and spaced apart to define a gap 158. The gap 158 may have various dimensions ranging anywhere between ¼ of an inch and 5/16 of an inch, of course other example dimensions are possible; likewise, the seal 154 may be dimensioned accordingly in order to span the gap, examples include ¼ of an inch and 5/16 of an inch. Before doing so, the seal 154 may be placed between the first and second flanges 134, 136 with the first lobe 169 fitted in the first groove 146 and the second lobe 171 fitted in the second groove 148. The retainer 156 can then be tightened down from the outside where, as before, the joint assembly 110 may be accessible thereat. When tightened, the seal 154 may be trapped between the inner faces 138 and 142 to form a first sealing interface 184 between the first lobe 169 and the first groove 146, and to form a second sealing interface 186 between the second lobe 171 and the second groove 148. Like the first exemplary embodiment, upon a change in shape, the joint assembly 110 may permit relative movement between the first and second inner faces 138 and 142 while maintaining the sealing interfaces 184 and 186. In this embodiment, the relative movement may further squeeze the seal 154. As before, the first and second inner faces 138 and 142 may contact each other at a point or a line to form an additional seal.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A tub assembly for a battery bath, the tub assembly comprising:
   a first section having side and bottom walls and a first flange at a free end of the walls, the first flange having a first inner face;
   a second section having side and bottom walls and a second flange at a free end of the walls, the second flange having a second inner face; and
   a joint assembly initially spacing apart the first inner face from the second inner face with a gap of at least about ¼ inch between the first and second inner faces and connecting together the first and second flanges while permitting relative displacement and movement between the first and second inner faces without coming into contact along their opposing extent; and
   a flexible seal engaging both the first and second flanges and providing a liquid seal of the gap while permitting relative displacement and movement between the first and second inner faces while still maintaining the liquid seal of the gap.

2. The tub assembly of claim 1 wherein the first flange and the first section are one-piece, and the second flange and the second section are one-piece.

3. The tub assembly of claim 1 wherein the seal forms a first sealing interface between a first side of the seal and a first outer face of the first flange, and the seal forms a second sealing interface between a second side of the seal and a second outer face of the second flange.

4. The tub assembly of claim 1 wherein the seal forms a first sealing interface between one side of the seal and the first inner face, and the seal forms a second sealing interface between an opposite side of the seal and the second inner face.

5. The tub assembly of claim 1 wherein the joint assembly accommodates changes in shape of the first and second sections whereby, when the changes in shape occur, the first and second inner faces move toward each other.

6. The tub assembly of claim 1 wherein the seal has a first protrusion received in a first groove in the first outer face and trapped therein by a first retainer, and the seal has a second protrusion received in a second groove in the second outer face and trapped therein by a second retainer.

7. The tub assembly of claim 1 wherein the seal has a first protrusion received in a first groove in the first inner face and trapped therein by a plurality of bolts, each bolt extending between the first flange and the second flange, and the seal has a second protrusion received in a second groove defined in the second inner face and trapped therein by the plurality of bolts.

8. The tub assembly of claim 1 wherein the seal substantially follows the longitudinal extent of the opposing first and second flanges.

9. The tub assembly of claim 1 comprising a first locking plate secured to a first outer face of the first flange via a plurality of first bolts to trap a first side of the seal between the first locking plate and the first outer face, and a second locking plate secured to a second outer face of the second flange via a plurality of second bolts to trap a second side of the seal between the second locking plate and the second outer face.

10. The tub assembly of claim 1 wherein the seal has a first retention feature that mates with a complementary second retention feature of the first outer face, and the seal has a third retention feature that mates with a complementary fourth retention feature of the second outer face.

11. The tub assembly of claim 10 wherein the first retention feature is a first bead extending longitudinally along the first side, the second retention feature is a first groove extending longitudinally along the first outer face, the third retention feature is a second bead extending longitudinally along the second side, and the fourth retention feature is a second groove extending longitudinally along the second outer face.

12. The tub assembly of claim 7 wherein, when the plurality of bolts are tightened, the seal is trapped between the first inner face and the second inner face and the gap remains defined between the first flange and the second flange.

13. A tub assembly for a battery bath, the tub assembly comprising:
   a first section having a first flange at a free end, the first flange having a first inner face and a first retention feature;
   a second section having a second flange at a free end, the second flange having a second inner face and a second retention feature;
   a seal having a third retention feature mating with the first retention feature and having a fourth retention feature mating with the second retention feature, the seal providing a liquid seal of a gap of at least ¼ of an inch between the first inner face and the second inner face such that the first and second inner faces do not contact each other along their opposing extent; and
   a joint assembly connecting the first and second sections together with the gap between them and permitting movement of the first inner face and the second inner face toward each other without the first and second inner faces contacting each other along their opposing extent.

* * * * *